United States Patent
Vidjak

[15] 3,675,273
[45] July 11, 1972

[54] FISH BUTCHERING APPARATUS

[72] Inventor: Frank V. Vidjak, Long Beach, Calif.

[73] Assignee: Star-Kist Foods, Inc., Terminal Island, Calif.

[22] Filed: Nov. 27, 1970

[21] Appl. No.: 93,066

[52] U.S. Cl. ................................................ 17/61
[51] Int. Cl. ............................................ A22c 25/14
[58] Field of Search .................. 17/60, 59, 61, 63, 57, 52

[56] References Cited

UNITED STATES PATENTS

| | | | |
|---|---|---|---|
| 2,423,174 | 7/1947 | Brown | 17/63 |
| 2,479,010 | 8/1949 | Jones | 17/57 |
| 3,082,094 | 3/1963 | Kramer | 17/60 X |

FOREIGN PATENTS OR APPLICATIONS

| | | | |
|---|---|---|---|
| 655,580 | 12/1928 | France | 17/61 |

Primary Examiner—Lucie H. Laudenslager
Attorney—Fulwider, Patton, Rieber, Lee & Utecht

[57] ABSTRACT

Fish butchering apparatus for separating a fish into a main loin section and a lower head and belly section. The apparatus includes a power-operated vertically movable knife which is urged towards and away from a horizontal table upon which a fish is positioned. Means on the table cooperate to position a fish so that the knife will cut downwardly through such fish along a line extending approximately from the center of the eye to the vent regardless of the size of the fish.

10 Claims, 8 Drawing Figures

PATENTED JUL 11 1972

INVENTOR.
FRANK V. VIDJAK

BY Fulwider, Patton, Rieber,
Lee and Utecht
ATTORNEYS

PATENTED JUL 11 1972 3,675,273

INVENTOR.
FRANK V. VIDJAK

BY Fulwider, Patton, Rieber,
Lee and Utecht
ATTORNEYS

PATENTED JUL 11 1972 3,675,273

INVENTOR.
FRANK V. VIDJAK
BY Fulwider, Patton, Rieber, Lee and Utecht
ATTORNEYS

FISH BUTCHERING APPARATUS

BACKGROUND OF THE INVENTION

It has been heretofor proposed to eviscertate tuna and similar fish by making a cut along a line passing approximately through the vent and just below the roof of the stomach of the fish. This method of butchering fish is shown in U. S. Pat. No. 3,082,094 issued to Jack Kramer, Mar. 19, 1963.

Butchering of fish in this manner permits the loin portion to be shipped to the cannery while the lower head and belly section may be consumed adjacent the fishery. Considerable difficulty has been experienced in practicing this method of fish butchering by power-operated means however, since tuna are of various sizes.

SUMMARY OF THE INVENTION

The fish butchering apparatus of the present invention includes a power-operated knife which cuts through a fish along a line extending approximately from the center of the eye to the vent of the fish. The apparatus also includes a fixed belly-engaging guide, a transversely movable back-engaging plate and a longitudinally movable nose-engaging plate. The plates are operatively interconnected by linkage means which automatically cause the nose-engaging plate to move a predetermined longitudinal distance when the back-engaging plate is moved a transverse distance corresponding to the width of the fish. With this arrangement, the guide and plates automatically position any size of fish so that the knife will cut the fish along a line extending approximately from the center of the eye to the vent regardless of the size of the fish.

DESCRIPTION OF THE PREFERRED EMBODIMENT

Figure 1:
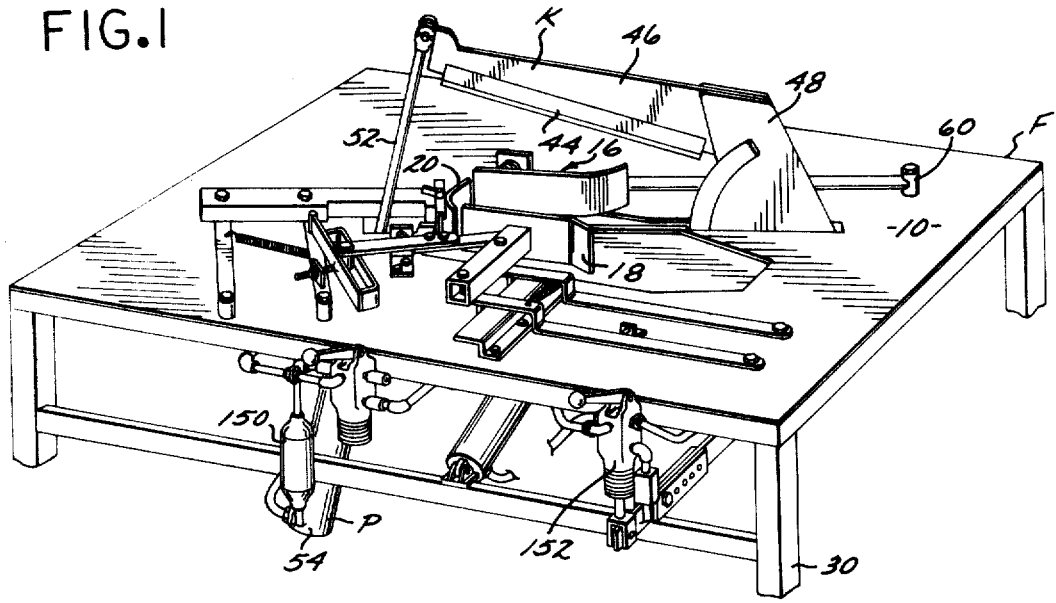
FIG. 1 is a perspective view of a preferred form of fish butchering apparatus embodying the present invention;
DESCRIPTION

Referring to the drawings, a preferred form of fish butchering apparatus embodying the present invention includes a frame F having a horizontal table 10. A vertically movable knife K is carried by the frame F. Power-operated means P are interposed between the frame F and the knife K to urge the knife downwardly toward the table so as to butcher a fish T disposed upon the upper surface of the table and thereafter raise the knife. A fixed belly-engaging guide, generally designated 16, is mounted on the table 10. Also, mounted on the table are a transversely movable back-engaging plate 18 and a longitudinally movable nose-engaging plate 20. Linkage means L operatively connects the plates 18 and 20 to cause the nose-engaging plate 20 to move a predetermined longitudinal distance relative to the longitudinal axis of the fish when the back-engaging plate 18 is moved a transverse distance corresponding to the width of the fish T. The guide 16, plates 18 and 20 and linkage means L cooperate to automatically position a fish so that knife K will cut downwardly through the fish along a line extending approximately from the center of the eye through the vent regardless of the size of the fish.

More particularly, the frame F includes legs 30 and upper and intermediate cross-pieces 32 and 34, respectively. The table 10 is rigidly supported at the upper end of the legs 30. As indicated particularly in FIGS. 6 and 7, the table is formed with a head-receiving aperture 40 and a body-receiving opening 42. The knife K includes an elongated blade 44 which is carried by an arm 46. The arm 46 is attached to a crank 48 which as indicated in FIG. 8 is pivotally connected to the frame F by a pivot pin 50. The opposite end of arm 46 is pivotally connected to the free end of a rod 52 that extends from an air cylinder 54 carried by frame F, such cylinder and piston comprising the power-operated means P. Reciprocation of the rod 52 relative to the cylinder 54 will effect vertical movement of the knife K towards and away from the upper surface of table 10.

The belly-engaging guide 16 includes a curved elongated pusher element 58 which is disposed just above the upper surface of table 10 on the side of knife K opposite the back-engaging plate 18. Pusher element 58 is affixed to the free end of a support bar 59 having its opposite end pivotally secured to the table 10 by a pivot post 60. The pusher element 58 is constantly though gently urged towards a fish being butchered by a compression spring assembly 61 affixed to table 10.

The back-engaging plate 18 is rigidly affixed at its intermediate portion to a transversely extending support bar 62. The free end of bar 62 is pivotally connected to one end of a pivot rod 64, while the intermediate portion of bar 62 is pivotally connected to one end of a second pivot rod 66, such rods 64 and 66 being substantially parallel. The ends of the rods 64 and 66 opposite bar 62 are pivotally secured to the table 10. A tension spring 67 biases rod 64 towards a fish being butchered, such spring being secured to a slider block 68 upon which bars 64 and 66 ride.

Figure 3:
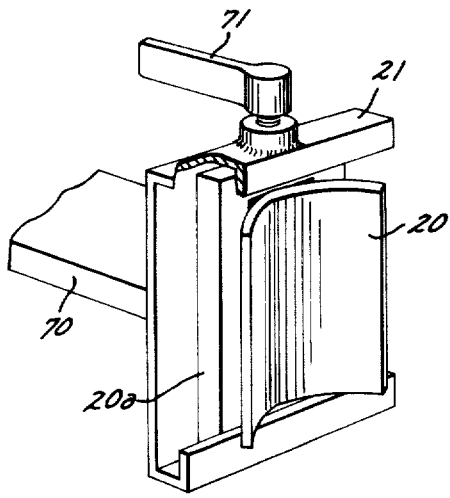
FIG. 3 is a fragmentary perspective view of a nose-engaging plate of said apparatus.

The nose-engaging plate 20 is preferably configured to conform to the general profile of the nose of a fish to be butchered. As shown in FIG. 3, the nose-engaging plate 20 is adjustable transversely along a generally C-shaped guide 21 secured to the free end of a rod 70 by means of an adjustment screw 71, the guide 21 slidably receiving a plate 20a formed on nose plate 20. Adjustment screw 71 extends through a threaded bore formed in the guide 21 to engage the plate 20a of nose plate 20. Support bar 70 extends at an angle relative to the longitudinal axis of a fish to be butchered towards the same side of the table 10 at which the belly-engaging plate 18 is positioned. The front end of bar 70 is pivotally connected to one end of a rod 72, while the intermediate portion of bar 70 is pivotally connected to one end of a second rod 74. The rods 72 and 74 are substantially parallel and the ends of such rods opposite bar 70 are pivotally connected to the table 10. A slider cage 76 is pivotally connected at one end to the intermediate portion of the rod 74. An adjustment screw 78 is interposed between the intermediate portion of slider cage 76 and the outer portion of rod 74. A tension spring 80 extends between the inner portion of rod 72 and the table 10 to bias nose-engaging plate 20 rearwardly towards the nose of fish T. A two-piece leg 82 interconnects the slider cage 76 and the inner portion of support bar 62, the length of such leg 82 being adjustable by means of a bolt and slot connection 84. The free end of leg 82 is provided with a depending slider post 86 which is slidably movably along the confines of the slider cage 76.

The afore-described linkage between the belly-engaging plate 18 and the nose-engaging plate 20 so interconnects these plates as to cause the nose-engaging plate 20 to be moved a predetermined longitudinal distance relative to a fish being butchered when the back-engaging plate 18 is moved a transverse distance corresponding to the width of the fish being butchered. The position of belly-engaging guide 16 remains substantially fixed. It has been determined that most tuna and tuna-like fish are so proportioned that a transverse movement of the back-engaging plate 18 to a longitudinal movement of the nose-engaging plate 20 in the ratio of approximately 1 to 1½ will automatically position or index a fish to be butchered so that the knife K will cut downwardly through the fish along a line extending approximately from the center of the eye to the vent of the fish regardless of the size of such fish.

Figure 2:
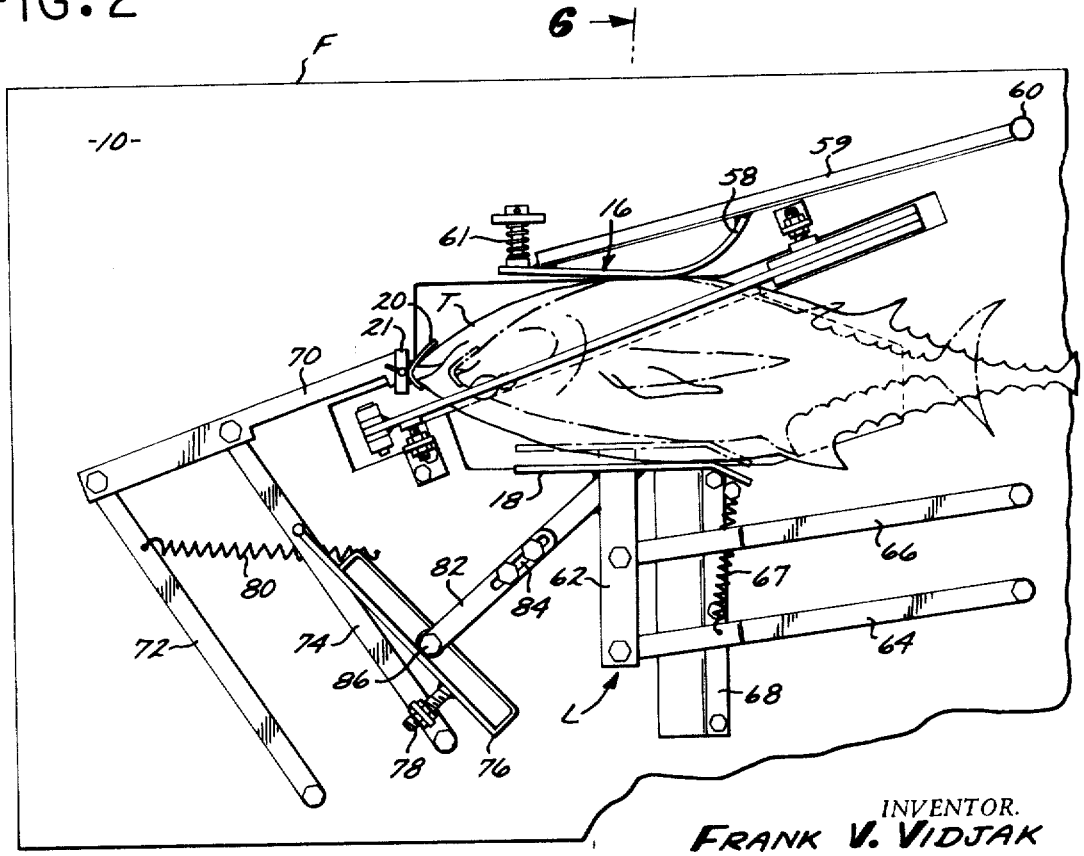
FIG. 2 is a broken top plan view of said apparatus.

Thus, referring to FIG. 2, a comparatively large fish T is shown in solid outline disposed within the confines of a space defined by pusher element 59 of the belly-engaging guide 16, back-engaging plate 18 and nose-engaging plate 20, such fish being arranged on its side. When a smaller fish (indicated in phantom outline) is to be butchered, the back-engaging plate 18 will move transversely inwardly under the influence of tension spring 67 to its phantom outline position to abut the back of such smaller fish. This transverse movement of the back-engaging plate 18 will effect a rearward longitudinal movement of the nose-engaging plate 20 to its phantom outline position of FIG. 2. The ratio of transverse movement of the back-engaging plate 18 to the longitudinal movement of the nose-engaging plate 20 will approximate 1 to 1½, i.e. if plate 18 moves 1 inch, plate 20 will move 1½ inches, approximately. During such movement of the back-engaging plate 18 and the nose-engaging plate 20, the position of the belly-engaging guide 16 will remain substantially constant since pusher element 59 is yieldingly retained in its position of FIG. 2. When the plates 18 and 20 have undergone the above-described relative movement, they will in their new positions index or position the smaller size fish so that upon downward movement of the knife K the smaller size fish will be cut through a line extending approximately from the center of the eye to the vent of such smaller size fish.

During the cutting operation, the pusher element 58 of the belly-engaging guide 16 will cooperate with the back-engaging plate 18 and nose-engaging plate 20 to gently but firmly retain the fish against twisting as the knife is moved downwardly through the fish. To aid in obtaining this result, the pusher element may be formed with a plurality of ribs 58a, as indicated in FIGS. 6 and 7, the fins of a fish being butchered by compressed between such ribs.

Figure 4:
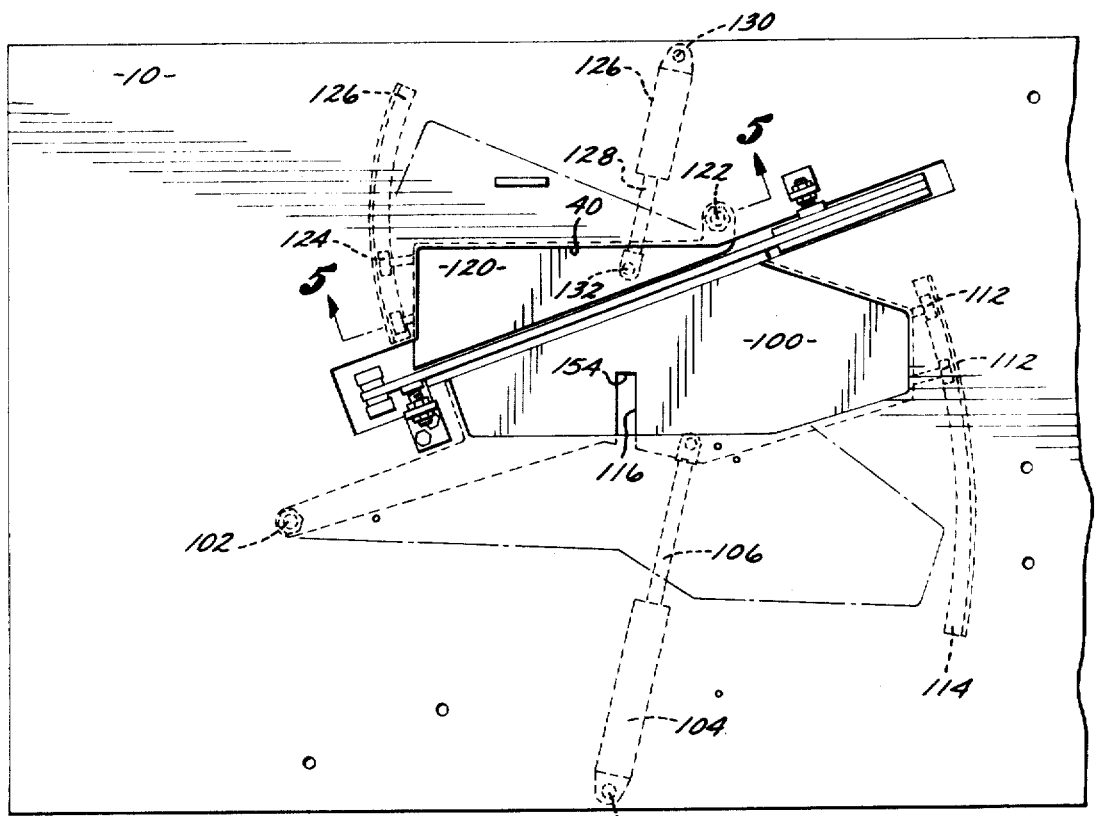
FIG. 4 is a top view of said apparatus, with some parts being deleted in the interest of clarity.
Figure 5:
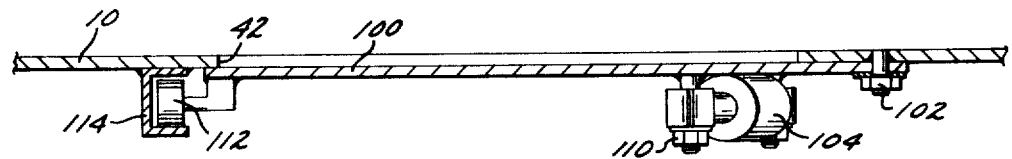
FIG. 5 is a vertical sectional view taken in enlarged scale along line 5—5 of FIG. 4.

Referring now particularly to FIGS. 4–7, the body-receiving opening 42 of table 10 is normally closed by a horizontally movable gate panel 100 which is pivotally secured to the table 10 by a pin 102 free end of the rod 102 of an air-operated cylinder 104. The gate 100 underlies table 10 with its edges slightly overlapping opening 42. In FIG. 4, gate 100 is shown in its closed position by solid and dotted outline and in its open position by phantom lines. The belly, back and nose-engaging devices have been deleted from this figure in the interest of clarity. Gate 100 is moved between its open and closed positions by means of an air cylinder 104 and rod 106 unit of conventional construction. One end of cylinder 104 is pivotally attached to the underside of table 10 by pin 108, while the free end of rod 106 is pivotally attached to the intermediate portion of gate 100 by pin 110. As shown in FIG. 5 the end of gate 100 opposite pin 102 carries support rollers 112 that ride in a track 114 secured to the underside of table 100. It should be noted that the intermediate portion of gate 100 is formed with an elongated slot 116 that is aligned with a finger 118 that depends from the end of bar 62 adjacent pusher element 58.

With continued reference to FIGS. 4–7, the head-receiving aperture 40 of table 10 is provided with a gate panel 120 which, like gate 100, underlies the table 10 with its edges overlapping the opening 40. One end of panel 120 is pivotally attached to the underside of table 10 by a pivot pin 122. The opposite end of gate 120 is provided with support rollers 124 similar to support rollers 112 which ride in a track 126 secured to the underside of table 10. Gate 120 is moved between its opened and closed positions by means of an air cylinder 126 and rod 128 unit of conventional construction. One end of cylinder 126 is pivotally connected to the underside of table 10 by pin 130, while the free end of rod 128 is pivotally attached to the intermediate portion of gate 120 by pin 132. Gate 120 is shown in its closed position in FIG. 4 by solid and dotted outline and in its open position by phantom lines.

Figure 6:
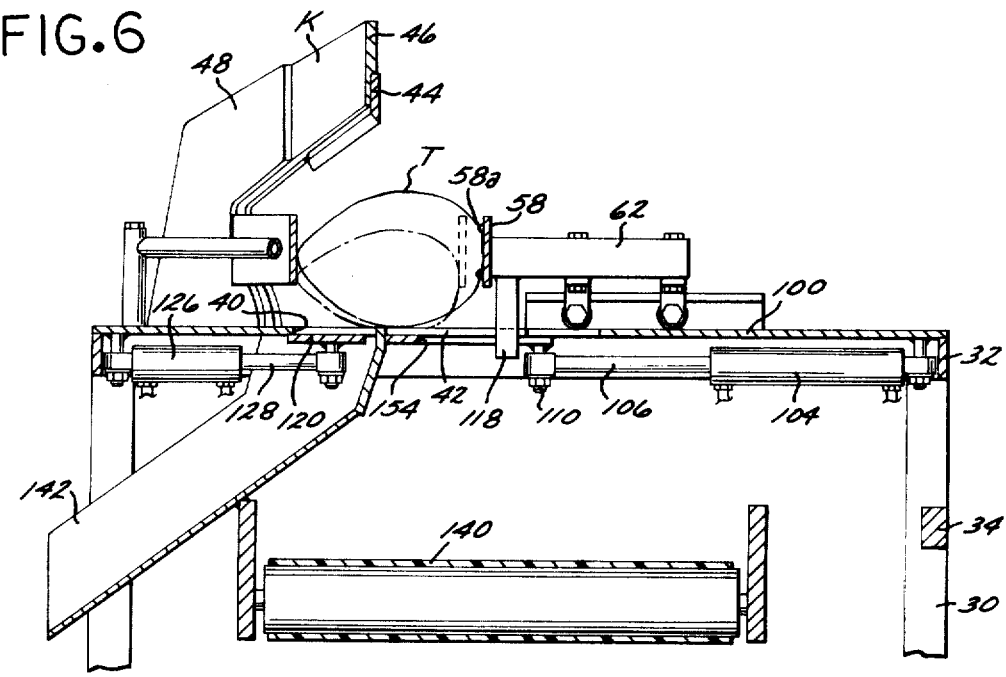
FIGS. 6 and 7 are vertical sectional views taken along line 6—6 of FIG. 2 showing the operation of said apparatus.
Figure 7:
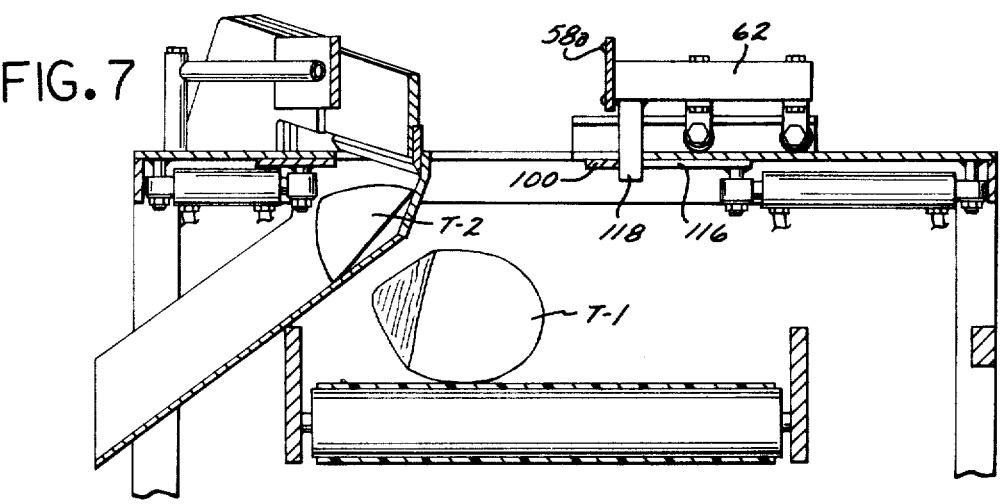
Figure 8:
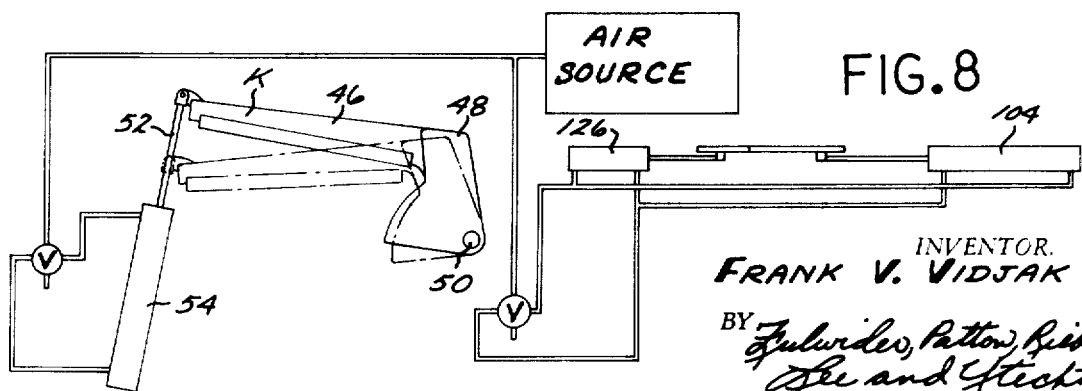
FIG. 8 is a schematic view showing the arrangement for power-actuating said apparatus.

A conveyor belt 140 of conventional construction is positioned below body-receiving aperture 42 of the table 10, as shown in FIGS. 6 and 7. A chute 142 extends downwardly from the underside of the table from the head-receiving aperture 40 formed in the table.

In the operation of the aforedescribed apparatus, a fish T to be butchered (shown in solid outline in FIG. 2) is positioned upon the top of the table 10 with the parts of such apparatus being disposed as shown in FIGS. 2 and 6. At this time, the back of the fish T abuts the back-engaging plate 18 while the nose of the fish abuts the nose-engaging plate 20. It should be particularly noted that the nose-engaging plate 20 may be adjusted transversely relative to the fish T by means of the aforedescribed adjustment screw 71. This arrangement permits the cut through the fish made by the knife K to be adjusted for maximum recovery without damaging the loins. The belly cavities of fish vary in accordance with the species of the fish. Accordingly, the ability to effect such adjustment is often important.

With the fish T being held securely in its solid outline position of FIGS. 2 and 6 the power-operated means P is actuated by a conventional valve 150 to cause the piston rod 52 to move downwardly within its cylinder 54. Such movement of rod 52 urges the knife K downwardly from its raised position of FIGS. 1 and 6 to its lowered position of FIG. 7 so as to sever the loin portion T–1 of the fish from the head and belly section T–2 thereof, as indicated in FIG. 7. With continued reference to FIG. 7, when the knife K reaches its lower position, the rod 106 of cylinder 104 will be retracted by means of a suitable conventional valve 152. Concurrently, the rod 128 will be retracted within its cylinder 126 by means of the same valve 152. The retraction of rods 106 and 128 effects concurrent pivoting of gates 100 and 120 to their open position of FIG. 7. As these gates are opened the fish portions T–1 and T–2 will respectively drop through openings 42 and 40.

With further reference to FIGS. 6 and 7, it should be particularly noted that as gate 100 is moved to its open position of FIG. 7, the finger 118 secured to bar 62 will be engaged by the inner end 154 of opening 116 of gate 100 so as to positively retract the pusher element 58 from engagement with the fish T. In this manner, the fish is positively released from element 58 and is therefore free to drop through openings 40 and 42. When piston rod 106 is again extended, element 58 and its associated parts will be returned towards belly-engaging guide 16 by means of spring 67.

After the first fish has been butchered, another fish to be butchered may be positioned upon the table 10 between the belly-engaging guides 16, back-engaging plate 18 and nose-engaging plate 20. Should the size of the second fish to be butchered vary from the size of the first fish (as for example, be smaller in size as indicated in phantom outline in FIGS. 2 and 6), the guide 16 and plates 18 and 20 will automatically position or index the second fish so that when the knife K is again urged downwardly it will cut through such second fish along a line extending from approximately the center of the eye to the vent of the fish. It has been determined that a single machine will conveniently handle fish ranging in weight from approximately 5 pounds to 25 pounds. Should the weight of the fish butchered be greater, a larger machine can be constructed to handle fish weighing from approximately 25 pounds to 60 pounds.

Various modifications and changes can be made with respect to the foregoing description without departing from the spirit from the present invention.

I claim:

1. Butchering apparatus for use with tuna-like fish of various sizes, comprising;
    a frame having a horizontal table, the upper surface of said table receiving fish to be butchered;
    a vertically movable knife carried by said frame;
    power-operated means interposed between said frame and said knife to urge said knife downwardly towards said table, to butcher a fish disposed on its side upon the upper surface of said table and to thereafter raise said knife;
    a fixed belly-engaging guide on said table;
    a transversely movable back-engaging plate on said table;
    a longitudinally movable nose-engaging plate on said table; and linkage means operatively interconnecting said plates to cause said nose-engaging plate to automatically move a predetermined longitudinal distance when said back-engaging plate is moved a transverse distance corresponding to the width of a fish to be butchered, whereby said guide and said plates will position different sizes of fish so that said knife will cut downwardly through said fish along a line extending approxiamtely from the center of the eye to the vent of said fish.

2. Butchering apparatus as set forth in claim 1 wherein said linkage effects a transverse movement of said back-engaging plate to a longitudinal movement of said nose-engaging plate in the ratio of approximately 1 to 1½.

3. Butchering apparatus as set forth in claim 1 wherein said belly-engaging guide includes a pusher element and spring means constantly though gently urging said pusher element towards a fish being butchered.

4. Butchering apparatus as set forth in claim 1 wherein said table is formed with a head-receiving aperture and a body-receiving opening, and said aperture and opening are normally closed by panel means, means operatively interposed between said frame and said panel means to move said panel means to an open position as said knife reaches its lower position.

5. Apparatus as set forth in claim 1 wherein said nose-engaging plate is adjustable transversely relative to said fish.

6. Butchering apparatus as set forth in claim 2 wherein said belly-engaging guide includes a pusher element and spring means constantly though gently urging said pusher element towards a fish being butchered.

7. Butchering apparatus as set forth in claim 2 wherein said table is formed with a head-receiving aperture and a body-receiving opening, and said aperture and opening are normally closed by panel means, means operatively interposed between said frame and said panel means to move said panel means to an open position as said knife reaches its lower position.

8. Butchering apparatus as set forth in claim 2 wherein said nose-engaging plate is adjustable transversely relative to said fish.

9. Apparatus as set forth in claim 3 wherein said table is formed with a head-receiving aperture and a body-receiving opening, and said aperture and opening are normally closed by panel means, means operatively interposed between said frame and said panel means to move said panel means to an open position as said knife reaches its lower position.

10. Apparatus as set forth in claim 4 wherein said nose-engaging plate is adjustable transversely relative to said fish.

* * * * *